United States Patent Office 2,791,499
Patented May 7, 1957

2,791,499

METHOD OF REDUCING REFRACTORY METAL COMPOUNDS

John William Clegg and William Anthony Meeley, Columbus, Ohio, assignors, by mesne assignments, to Ethyl Corporation, New York, N. Y., a corporation of Delaware No Drawing. Application July 13, 1953,
Serial No. 367,775

6 Claims. (Cl. 75—84.5)

The present invention relates to the refractory metals, and is directed to an improved process for preparing these metals by reduction of their respective compounds. The process is especially useful in reducing compounds of titanium and zirconium.

The refractory metals, and particularly those of group IVB of the periodic table, which includes titanium, zirconium, and hafnium, have long been recognized as possessing unusual properties which render them highly useful as structural and alloying elements. Titanium, for example, is not only a lightweight metal but is highly resistant to corrosion and possesses outstanding strength characteristics. These properties render this metal of particular interest to the aircraft and chemical industries. Likewise, the physical and chemical properties of zirconium are such that it is of considerable interest to the chemical industry. In spite of such outstanding properties, however, these and other refractory metals have not achieved widespread commercial use primarily because no entirely satisfactory commercial method for their preparation has been developed.

The refractory metals occur in nature largely as oxide ores, but since these oxides are very difficult to reduce directly it is generally necessary to convert them to a more readily reducible compound such as a halide or sulfide. Titanium is produced on a somewhat limited scale at the present time by a process which involves converting an oxide ore, such as rutile, to titanium tetrachloride and thereafter reducing the tetrachloride with magnesium. Although this process does offer some promise of commercial success, the chief drawback is that expensive and complex process equipment must be used since it is necessary to use very high temperatures during the reduction step. It has also been proposed to prepare titanium and zirconium batchwise by reducing their halogen salts with sodium in a steel bomb, but here again very high temperatures and pressures are employed. Another process which has received some attention with respect to the preparation of titanium consists of the high temperature thermal decomposition of titanium iodide. Nevertheless, all of these processes involve the use of elevated temperatures and for various reasons have not been susceptible to widespread commercial application.

It is therefore an object of our invention to overcome the above shortcomings of the prior art and provide an improved method for reducing refractory metal compounds. Another object of our invention is to provide an improved process for reducing compounds of titanium and zirconium with an alkali metal. A further object of our invention is to provide such a process which is conducted at relatively low temperatures. Still other objects of our invention will become apparent from a consideration of the following description wherein the details of our process are described.

Broadly speaking, the above and other objects of our invention are accomplished by reducing a refractory metal compound with an alkali metal which is in the unique form of dispersed particles suspended in a liquid medium which is chemically inert to the reactants. The chief advantages of the present process over those of the prior art are essentially two-fold. In the first place, relatively low temperatures are employed so as to permit the use of conventional process equipment, and secondly, the process is carried out at substantially atmospheric pressure so as to eliminate the necessity of using expensive and heavy pressure equipment. For example, when reducing titanium tetrachloride with metallic sodium in accordance with the present invention, the reaction is initiated at room temperature and will proceed smoothly to substantial completion at temperatures not exceeding about 150–200° C. This permits the use of simple process equipment and results in operating economies heretofore not realized by the prior art methods. The nature of the process is such that it can be readily controlled in contrast to the former methods which require the use of a pressure bomb when reducing titanium tetrachloride with sodium.

Although the process of the present invention will be described primarily in relation to the reduction of titanium tetrachloride with metallic sodium, the process is applicable to the reduction of any refractory metal compound capable of being reduced by an alkali metal. The term "refractory metal" as used herein is intended to mean those metals having melting points of about 1700° C. or higher and whose ores or oxides are difficult to reduce directly by conventional methods. Typical refractory metals are chromium, columbium, molybdenum, tantalum, thorium, titanium, tungsten, vanadium and zirconium to mention a few. Typical of the refractory metal compounds to which the present process can be applied are the halides, sulfates, sulfides and the like. For the most part, the oxides are not well suited. Specific but non-limiting examples of compounds that can be used are chromic chloride, columbium pentachloride, columbium pentabromide, molybdenum pentachloride, tantalum chloride, thorium chloride, titanium tetrachloride, tungsten pentachloride, titanium sulfate, zirconium sulfate, titanium sulfide, zirconium sulfide, vanadium tetrachloride, zirconium tetrabromide, zirconium trichloride, zirconium tetrachloride and the like. Although, as indicated above, any compound capable of being reduced by an alkali metal can be used, the reduction of the halides, and especially the chlorides, represent preferred embodiments of the present invention. The process is especially useful when applied to the reduction of titanium and zirconium chlorides since these compounds are readily prepared from the corresponding oxides or ores by a simple halogenation process. For example, titanium tetrachloride, which is a liquid under normal conditions of temperature and pressure, is prepared by a process which involves briquetting an ore, such as ilmenite or rutile, with carbon and a binder, such as tar, and thereafter subjecting the briquettes to chlorination in a furnace.

According to our invention a refractory metal compound of the character described above is reduced by an alkali metal which is in the form of finely divided dispersed particles suspended in an inert liquid medium. This unique form of alkali metal is generally referred to as an alkali metal dispersion. Although dispersions of the alkali metals are available commercially, and this is especially true with respect to sodium dispersions, they can be prepared by merely fusing a brick or lump of alkali metal in an inert medium and subjecting this mixture to vigorous agitation while maintaining a temperature slightly above the melting point of the particular alkali metal. The agitation necessary to subdivide and uniformly disperse the alkali metal particles throughout the medium can conveniently be achieved by the use of a stirrer or counter-rotating stirrer operating at speeds from between about 5,000 and 15,000 R. P. M. Obviously other means can be employed for accomplishing the degree of agitation necessary to form the dispersion. For example, a conventional colloid mill can be used, in which case the heated mixture of alkali metal and inert medium is merely passed through the mill to form the dispersion. Another method consists of impinging a high velocity stream of inert medium containing the fused alkali metal against a rigid plate. Any of these or other methods can be successfully employed in forming the dispersions which are employed in the present invention.

The requirements and characteristics of the particular medium employed in forming the dispersion are not severe since it is only necessary that the medium be liquid at reaction conditions and chemically inert to the alkali metal, the particular metal compound being reduced, and the metal product. Although it is not essential, it is desirable that the medium have a boiling point above the melting point of the particular alkali metal which is to be dispersed therein so as to permit the preparation and utilization of the dispersion at atmospheric pressure. The hydrocarbons, both aliphatic and aromatic, are well suited to these requirements, although for use in the present process the straight-chain aliphatics are the preferred dispersing medium. Typical examples of hydrocarbons which can be employed as dispersing mediums include toluene, xylene, petroleum fractions, straight-run gasoline, alkylate, kerosene, n-octane, undecane, n-nonane, n-hexadecane and the like. Kerosene has been found to be especially useful for dispersions which are to be used in the present invention. The amount of dispersing medium used in forming the dispersion is likewise not especially critical, and dispersions having metal concentrations from trace amounts up to 60 percent by weight can be conveniently prepared and used in the present process. We prefer to employ dispersions which have a metal concentration of between about 10 and 50 percent by weight since it has been found that dispersions having higher concentrations tend to render the reaction mixture somewhat viscous.

When an alkali metal dispersion is prepared by the aforementioned procedure, the resulting product is a suspension of finely divided particles of the alkali metal uniformly distributed throughout the body of the inert medium. The advantages achieved by our process depend to a large extent upon the particle size of the alkali metal particles which are present in the dispersion. If the alkali metal particles are too large, the reaction will not be initiated unless the mixture is heated to relatively high temperatures and then usually proceeds with explosive violence. If, however, the particle size is maintained within the limits hereinafter defined, the reaction will be initiated at about room temperature and proceeds smoothly to completion. Surprisingly, the presence of the small particles of alkali metal does not lead to an explosive and uncontrollable reaction, but rather renders the reaction easy to control. We have found that the average particle size should not exceed about 50 microns, and preferably should be about 10 microns or less for exceptionally good results. It is also recommended that there be a large percentage of particles having a size of 2 microns or less in the dispersion. In preparing dispersions the degree of agitation will, to a large extent, determine the average particle size of the alkali metal. Therefore, before any dispersion is used in the present process the particle size should be examined so as to determine whether it is within the range specified above. If the particles are too large they can usually be subdivided by merely heating the dispersion to above the melting point of the alkali metal and subjecting it to further agitation.

In carrying out our process conventional process equipment, such as a reaction vessel provided with a stirrer and a reflux condenser can be used. Means should be provided for blanketing the reaction mass with an inert gas such as dry argon so as to prevent atmospheric contamination. Nitrogen should not be used as the inert gas at any stage of the process since many of the refractory metals will combine with nitrogen. Contact with oxygen should be avoided throughout the process, and when unreacted alkali metal is present, exposure to moisture should also be avoided. Although it is preferable to add the refractory metal compound to the vessel containing the dispersion, the addition can, if desired, be accomplished by adding the dispersion to a body of the compound to be reduced. In either case, the addition should be at a controlled rate while stirring the mixture. Although the reaction is initiated at room temperature, it is exothermic and in order to maintain control over the reaction it may be necessary to provide means for cooling the vessel and its contents. In this connection it should be pointed out that the reaction can be carried out at the reflux temperature of the mixture with very good results, and in such a case the reflux condenser is usually sufficient to remove the heat of reaction. The reaction can also be controlled by controlling the rate at which the compound to be reduced is added to the dispersion. The reaction proceeds at a moderate rate, and is substantially complete after a stoichiometric amount of refractory metal compound has been added. After the total amount of refractory metal compound has been added it is preferable to maintain reaction conditions for an additional period of about 30 minutes so as to insure complete reaction. The process is carried out at substantially atmospheric pressure although, as indicated above, a slight positive pressure of an inert gas should be maintained in the reaction zone so as to prevent leakage of air into the system.

It is important that good agitation be provided for the reaction mixture during the reduction process, and this is especially true when using alkali metal dispersions wherein the average particle size is above 10 microns. This not only improves the co-mingling of the reactants, but in some instances will serve to further subdivide the alkali metal particles and insure a smooth and complete reaction at relatively moderate temperatures. When using dipersions having an average particle size of the order of 10 microns or less, somewhat less efficient agitation can be used, but in any event good agitation should be provided at all times. It is recommended that the agitation provided during the reduction be comparable to that used in preparing the alkali metal dispersion.

After the reaction is complete, the mixture is filtered so as to remove the dispersing medium, and the filter cake is then processed to recover the refractory metal. Since the filter cake will contain alkali metal salts, residual dispersing medium and usually a small amount of unreacted alkali metal in addition to the product, this latter step can be accomplished by placing the cake in an air-tight furnace and heating so as to volatilize these contaminants. Although the furnace can be operated at substantially atmospheric pressure, it is preferred to utilize a vacuum furnace at this stage in the process so as to permit the use of lower temperatures and shorter residence times. The vacuum in the furnace should be maintained at about 0.5 mm. Hg or less, and in order to insure complete removal of the contaminants, a temperature of 850°–900° C. should be maintained for a period of about 3 hours and a temperature of between 1000° C. and 1200° C. for an additional period of about 2 hours. In bringing the furnace up to temperature, the heating should preferably be accomplished slowly so as to avoid sudden volatilization of the dispersing medium and the alkali metal. It is also important to maintain an inert atmosphere in the furnace at all times; dry argon or helium can be used for this purpose.

Another method for recovering the refractory metal product from the reaction mixture consists of initially killing the unreacted alkali metal in the mixture by the addition of alcohol, and thereafter adding an inert solvent so as to dissolve the alkali metal salts. The mixture can then be subjected to physical separation such as filtration, centrifugation, sedimentation, or the like, so as to recover the product. When using sodium as a reducing agent and a refractory metal halide as a starting material, water from which dissolved oxygen has been dispelled or dilute acid can be employed as the inert solvent. For the most part, this alternate procedure for recovering the product is less desirable than that wherein a furnace is utilized since it leads to a product which is somewhat less ductile.

To illustrate our process in more detail as applied to the preparation of titanium from titanium tetrachloride, a dispersion of sodium in kerosene (25 percent sodium by weight) having an average sodium particle size of 7 microns is placed in a reaction vessel provided with a reflux condenser and a high speed (3000–8000 R. P. M.) stirrer. Liquid titanium tetrachloride is then added to the dispersion at a controlled rate, allowing the heat of reaction to raise the temperature to about 125–135° C. In order to avoid too rapid an elevation in reaction temperature, the tetrachloride is added a little at a time or dropwise. The addition of the stoichiometric amount of tetrachloride is complete in about 30 minutes, and reaction temperature (125–135° C.) is maintained for an additional period of about 25 minutes. As the reaction subsides during this period, external heat is applied so as to insure complete reaction. The reaction mixture is then filtered under an inert atmosphere so as to remove the kerosene and leave a filter cake containing finely divided titanium along with unreacted sodium and other contaminants such as the by-product sodium chloride. These contaminants are removed from the titanium by placing the crude product in a vacuum furnace evacuated to about 0.5 mm. Hg and heating. The furnace is heated slowly to about 150°–300° C. so as to allow residual kerosene to distill from the system. The furnace temperature is then raised to about 850–900° C. and held for about 3 hours, and finally to about 1200° C. for an additional 2 hours so as to completely volatilize the contaminants. A vacuum of less than 0.5 mm. Hg is maintained throughout most of the operation although sudden volatilization of the contaminants causes sporadic pressure surges. The material remaining after the furnacing operation is elemental titanium in the form of an agglomerate since at the temperature of the furnace there will be some sintering of the metal particles.

It is to be understood that other refractory metal compounds can be used in place of titanium tetrachloride with equally good results. Thus, zirconium tetrachloride, zirconium trichloride, titanium sulfide, and the like can be reduced in the above manner. Similarly, potassium or any other alkali metal can be used as the reducing agent in place of sodium if desired, although sodium is preferred. Therefore, we do not intend to limit our invention to the specific embodiments described herein, and we intend by the appended claims to cover all modifications falling within the spirit and scope of our invention.

We claim:
1. In a process for producing a refractory metal having a melting point above about 1700° C. which comprises reducing a compound selected from the group consisting of halides, sulfides and sulfates of the refractory metals with an alkali metal in an essentially inert atmosphere, the improvement which comprises causing said compound to react with alkali metal in the form of dispersed particles of average size no greater than about 50 microns suspended in an inert liquid hydrocarbon medium at a temperature no greater than about 150 to 200° C.

2. In a process for producing a refractory metal which comprises reducing a compound selected from the group consisting of halides, sulfides and sulfates of refractory metals selected from the group consisting of chromium, columbium, molybdenum, tantalum, thorium, titanium, tungsten, zirconium, vanadium and hafnium with an alkali metal in an essentially inert atmosphere, the improvement which comprises causing said compound to react with alkali metal in the form of dispersed particles of average size no greater than about 50 microns suspended in an inert liquid hydrocarbon medium at a temperature no greater than about 150 to 200° C.

3. The process of claim 2 wherein said compound is a halide.

4. The process of claim 3 wherein said compound is titanium tetrachloride.

5. The process of claim 4 wherein said alkali metal is sodium.

6. The process for the manufacture of titanium which comprises reacting titanium tetrachloride with a dispersion of sodium having an average particle size of 7 microns in kerosene at a temperature between about 125 to 135° C. under an essentially inert atmosphere, filtering the reaction mixture at the completion of the reaction to separate said kerosene, heating the solids obtained under vacuum of about 0.5 mm. of mercury between 150 to 300° C. to distill residual kerosene, and then raising the temperature to about 850 to 900° C. while maintaining said vacuum for about 3 hours and then to about 1200° C. for about 2 hours to volatilize contaminants from said titanium.

References Cited in the file of this patent

UNITED STATES PATENTS

| Number | Name | Date |
|---|---|---|
| 1,373,038 | Weber | Mar. 29, 1921 |
| 2,586,134 | Winter | Feb. 19, 1952 |
| 2,607,674 | Winter | Aug. 19, 1952 |
| 2,618,549 | Glasser et al. | Nov. 18, 1952 |
| 2,618,550 | Hampel et al. | Nov. 18, 1952 |
| 2,621,121 | Winter | Dec. 9, 1952 |
| 2,647,826 | Jordan | Aug. 4, 1953 |

FOREIGN PATENTS

| Number | Country | Date |
|---|---|---|
| 832,205 | Germany | Feb. 21, 1952 |
| 686,845 | Great Britain | Feb. 4, 1953 |
| 386,621 | Great Britain | Feb. 16, 1953 |